(12) United States Patent
Wang

(10) Patent No.: US 8,694,987 B2
(45) Date of Patent: Apr. 8, 2014

(54) SERVER RACK SYSTEM

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 127 days.

(21) Appl. No.: 13/414,361

(22) Filed: Mar. 7, 2012

(65) Prior Publication Data

US 2013/0139141 A1 May 30, 2013

(30) Foreign Application Priority Data

Nov. 28, 2011 (CN) .......................... 2011 1 0383868

(51) Int. Cl.
*G06F 9/44* (2006.01)

(52) U.S. Cl.
USPC .......................................... 717/170; 717/169

(58) Field of Classification Search
None
See application file for complete search history.

(56) References Cited

U.S. PATENT DOCUMENTS

| | | | |
|---|---|---|---|
| 5,613,119 A * | 3/1997 | France et al. ...................... 713/1 |
| 7,051,215 B2 * | 5/2006 | Zimmer et al. ............... 713/300 |
| 7,681,191 B2 * | 3/2010 | Yuuki ............................ 717/170 |
| 7,849,454 B2 * | 12/2010 | Lambert et al. ................ 717/168 |
| 7,996,829 B2 * | 8/2011 | Depew et al. .................. 717/170 |
| 2003/0217357 A1 * | 11/2003 | Parry ............................ 717/168 |
| 2006/0225069 A1 * | 10/2006 | Yuuki ............................ 717/170 |
| 2007/0033585 A1 * | 2/2007 | Fukui ............................ 717/168 |
| 2007/0169088 A1 * | 7/2007 | Lambert et al. ................ 717/168 |
| 2008/0109799 A1 * | 5/2008 | Imamura ........................ 717/168 |
| 2009/0116823 A1 * | 5/2009 | Zhang et al. .................. 388/811 |
| 2011/0083129 A1 * | 4/2011 | Masaki ......................... 717/175 |
| 2013/0067134 A1 * | 3/2013 | Austen et al. ................. 710/305 |
| 2013/0227538 A1 * | 8/2013 | Maruyama .................... 717/168 |

* cited by examiner

*Primary Examiner* — Chameli Das
(74) *Attorney, Agent, or Firm* — CKC & Partners Co., Ltd.

(57) ABSTRACT

A server rack system module is provided. Each rack internal device at least includes a control chip, and the rack internal devices include a plurality of servers. An integrated management module (IMM) is respectively coupled to the control chips, where the IMM stores integrated management firmware, and the integrated management firmware has latest version firmware of the control chip integrated therein and records latest version serial numbers of the latest version firmware. When the server rack system is started, the IMM reads a current version serial number of currently installed firmware of each control chip, and compares the current version serial number with the corresponding latest version serial number, so as to determine whether to update the currently installed firmware.

9 Claims, 2 Drawing Sheets

SERVER RACK SYSTEM

CROSS-REFERENCE TO RELATED APPLICATION

This application claims the priority benefit of China application serial no. 201110383868.0, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server architecture, in particular, to a. server rack system that can automatically update firmware.

2. Description of Related Art

Presently, servers are widely used in enterprises, and in addition to the application in combination of the Internet and the telecommunications, the application range has expanded into the lives of ordinary people, such as finance and economics, online banking, and use of online credit cards. All the applications rely on the powerful computing capability of the server to ensure that the information is highly confidential and cannot be easily cracked.

The types of the current servers are numerous, and common servers include rack servers and tower servers. The rack server is a tower server with an optimized structure, and is mainly designed to reduce the space occupied by the server as far as possible. Many specialized network devices (for example, switches, routers, and hardware firewalls) adopt a flat rack structure, just like a drawer. Generally, the width of a rack server is 19 inches, and the height is in a unit of U (1U=1.75 inches=44.45 millimeters), and there are servers of several standards of 1U, 2U, 3U, 4U, 5U, and 7U. In order to improve the application level of motherboards of the current servers, system manufacturers always design the motherboards of the servers to be compatible with the system of various types (for example, 1U, 2U, and 5U).

However, the server rack system includes various devices therein, for example, a fan control board (FCB), a power control unit, a baseboard management controller (BMC) of the servers, and all the devices needs to operate in cooperation with firmware. If the version of the installed firmware does not match the device (for example, after replacement of device, the firmware corresponding to the newly installed device is always of an older version), the problem that the firmware is not compatible with the device is occurred. Therefore, it is required to install or update the firmware of each device manually, resulting in the problem that the process is time consuming and it is easy to install firmware of an incompatible version.

SUMMARY OF THE INVENTION

Accordingly, the present invention is directed to a server rack system, which can automatically detect and update firmware of rack internal devices.

The present invention provides a server rack system, which includes a plurality of rack internal devices and an integrated management module (IMM). Each rack internal device at least includes a control chip, and the rack internal devices include a plurality of servers. The IMM is respectively coupled to the control chips, wherein the IMM stores integrated management firmware, and the integrated management firmware has latest version firmware of the control chips integrated therein, and records latest version serial numbers of the latest version firmware. When the server rack system is started, the IMM reads a current version serial number of currently installed firmware of each control chip, and compares the current version serial number with the corresponding latest version serial number, so as to determine whether to update the currently installed firmware.

In an embodiment of the present invention, the server rack system further includes a management switch, coupled to the control chips and the IMM. The IMM assigns a network address for each of the control chips through the management switch. The network address is, for example, a media access control (MAC) address.

In an embodiment of the present invention, the management switch is coupled to a rack management terminal. The rack management terminal uploads the integrated management firmware to the IMM through a file transfer protocol (FTP).

In an embodiment of the present invention, the integrated management firmware not only records the latest version serial number of the latest version firmware of each control chip, but also records an overall version number of the integrated management firmware. In the integrated management firmware with different overall version numbers, the latest version serial number of the latest version firmware of the same control chip integrated in the integrated management firmware may be the same or different. That is to say, the overall version number and the latest version serial number of each control chip may be the same or different.

In an embodiment of the present invention, the IMM is coupled to the control chip through an Ethernet or a connecting line, so that the IMM manages the control chips through the Ethernet or the connecting line.

In an embodiment of the present invention, the control chip includes a plurality of fan control boards (FCBs), at least one power control unit, and baseboard management controllers (BMCs) in the servers.

In an embodiment of the present invention, integrated management firmware is installed in the IMM, and the integrated management firmware has latest version firmware of the FCBs, latest version firmware of the BMCs, and latest version firmware of the power control unit integrated therein.

In an embodiment of the present invention, the server rack system further includes a service switch, coupled to the IMM and service network ports of the servers. The servers provide services to a service network through the service switch, and the service network is connected to a remote device. The IMM may upload the integrated management firmware to the remote device through the service switch.

Based on the above, after a rack internal device of the server rack system is replaced randomly, the server rack system automatically detects whether the firmware of the rack internal device matches the newly installed hardware, and automatically updates the firmware, thereby solving the problem that the rack internal device is not compatible with the firmware.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings BRIEF DESCRIPTION OF THE DRAWINGS... (omitted)

DESCRIPTION OF THE EMBODIMENTS

Figure 1A:
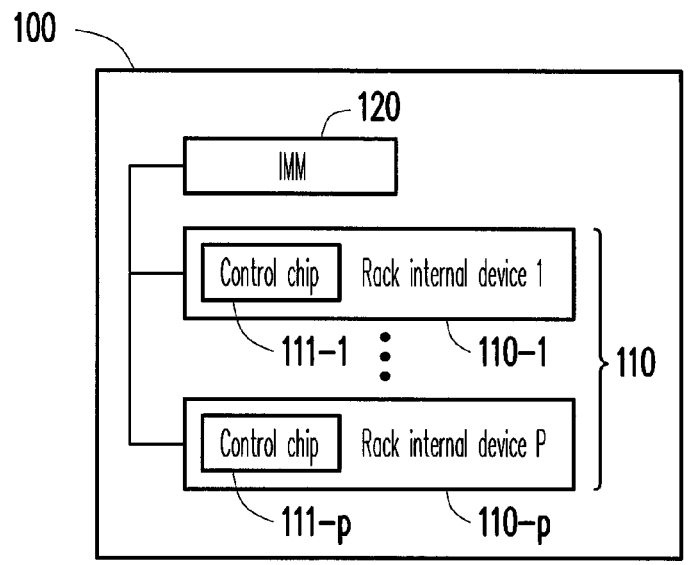
FIG. 1A to FIG. 1B are block diagrams of a server rack system according to a first embodiment of the present invention.

Reference will now be made in detail to the present embodiments of the invention, examples of which are illustrated in the accompanying drawings. Wherever possible, the same reference numbers are used in the drawings and the description to refer to the same or like parts.

First Embodiment

Figure 1B:
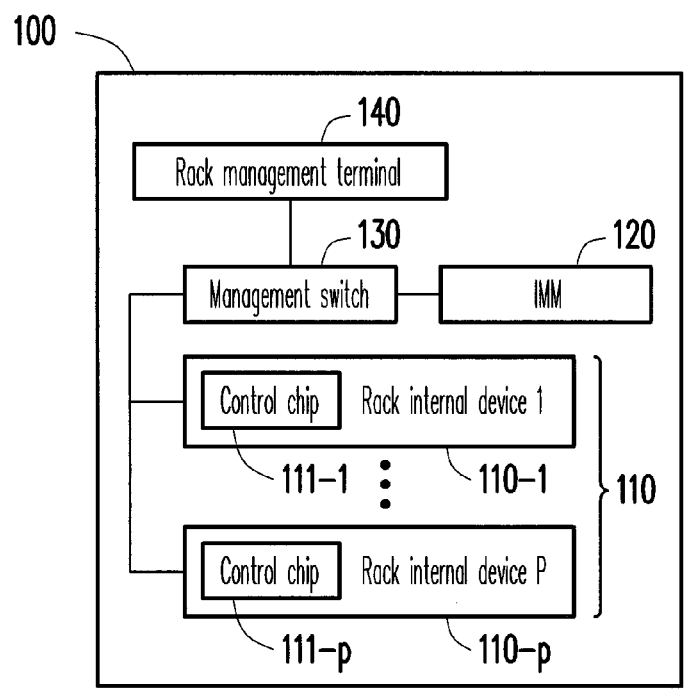

FIG. 1A to FIG. 1B are block diagrams of a server rack system according to a first embodiment of the present invention. In this embodiment, the server rack system 100 includes p rack internal devices 110 (110-1 to 110-p) and an IMM 120, where p is a positive integer greater than 1.

Referring to FIG. 1A, each rack internal device 110-1 to 110-p at least includes one of control chips 111-1 to 111-p. The IMM 120 is respectively coupled to the control chips 111-1 to 111-p. Moreover, the rack internal device 110 includes a plurality of servers. For example, the p rack internal devices have n servers, where n is a positive integer greater than 1 and less than p.

The IMM 120 is respectively coupled to the control chips 111-1 to 111-p. The IMM 120 is mainly used for managing the state of the rack internal devices 110-1 to 110-p in the server rack system 100. Moreover, the IMM 120 is further used for managing power up and power down of all the rack internal devices 110. For example, the IMM 120 may be a chip that integrates processor functions, a super input/output (I/O) chip, a video controller, and remote presence capability.

Herein, the IMM 120 stores integrated management firmware. The integrated management firmware has latest version firmware of the control chips integrated therein, and records latest version serial numbers of the latest version firmware. The IMM 120 is mainly used for managing the state of the rack internal devices 110 in the server rack system 100.

When the server rack system 110 is started, the IMM 120 reads a current version serial number of currently installed firmware of each of the control chips 111-1 to 111-p, and compares the current version serial number with the corresponding latest version serial number, so as to determine whether to update the currently installed firmware.

It should be noted that, the IMM 120 not only records the latest version serial number of the latest version firmware corresponding to each of the control chips 111-1 to 111-p, but also records an overall version number of the integrated management firmware. Herein, in the integrated management firmware with different overall version numbers, the latest version serial number of the latest version firmware of the same control chip integrated in the integrated management firmware may be the same or different. In other words, the version of the integrated management firmware is not required to match the latest version serial numbers of the latest version firmware of the control chips 111-1 to 111-p. That is to say, the overall version number and the latest version serial number of each control chip may be the same or different.

For example, when the overall version number of the integrated management firmware is updated to 2.0, the latest version serial numbers of the latest version firmware of the control chips 111-1 to 111-p integrated in the integrated management firmware may be maintained at the previous version (for example, 1.5). That is to say, when revising the integrated management firmware of the IMM 120, the manufacturer may not revise the firmware of the control chips 111-1 to 111-p. Therefore, the overall version number and the latest version serial number of each control chip may be the same or different.

Furthermore, in this embodiment, the IMM 120 is coupled to the control chips 111-1 to 111-p through an Ethernet or a connection line such as RS-485, power management bus (PMBus), and an intelligent platform management interface (IPMI), so that the IMM 120 manages the control chips 111-1 to 111-p through the Ethernet or the connecting line.

Next, referring to FIG. 1B, the server rack system 100 further includes a management switch 130. The management switch 130 is coupled to the control chips 111-1 to 111-p and the IMM 120. The IMM 120 assigns a network address for each of the control chips through the management switch 130. For example, the network address is an MAC address.

Additionally, in FIG. 1B, the management switch 130 is further coupled to a rack management terminal 140. The rack management terminal 140 uploads the integrated management firmware to the IMM 120 through a file transfer protocol (FTP). That is to say, a user may install or update the integrated management firmware of the IMM 120 at the rack management terminal 140 through the management switch 130.

It should be noted that, the control chip includes a plurality of FCBs, at least one power control unit, and BMCs in the servers. In the following, an embodiment is described for illustration.

Second Embodiment

Figure 2:
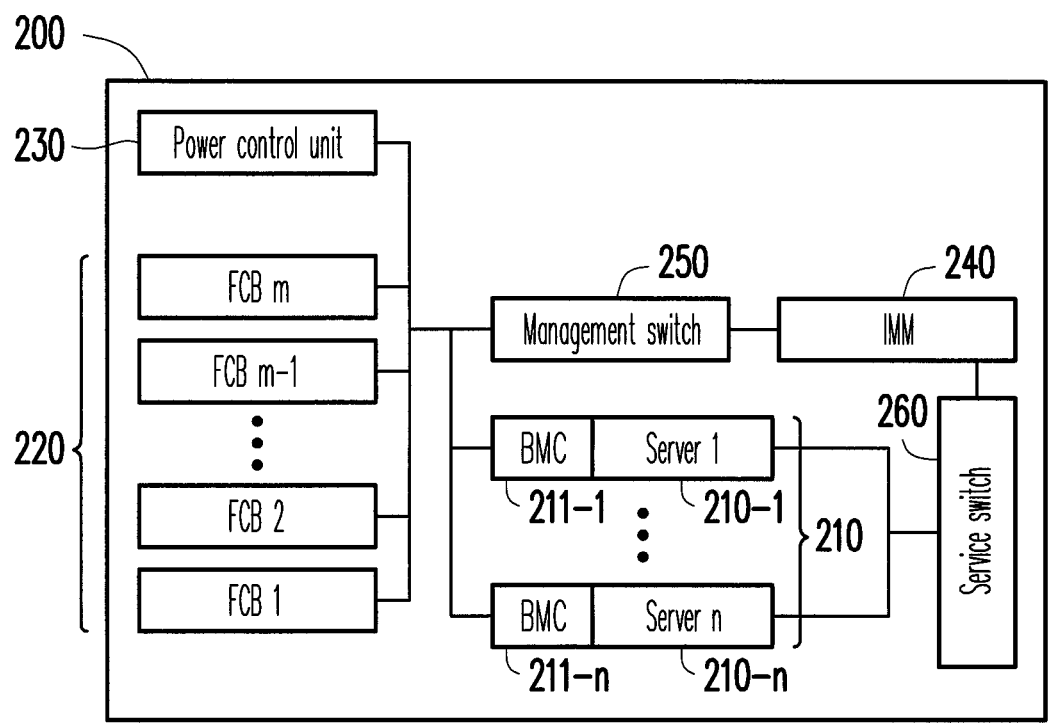
FIG. 2 is a block diagram of a server rack system according to a second embodiment of the present invention.

FIG. 2 is a block diagram of a server rack system according to a second embodiment of the present invention. Referring to FIG. 2, in this embodiment, the server rack system 200 includes n servers 210 (210-1 to 210-n), m FCBs 220, a power control unit 230, an IMM 240, a management switch 250, and a service switch 260. Herein, the servers 210 each include a BMC 211-1 to 211-n.

Herein, the IMM 240 is coupled to the BMCs 211-1 to 211-n, the FCB 220, and the power control unit 230 through the management switch 250. The IMM 240 is mainly used for managing the state of rack internal devices in the server rack system 200, namely, the state of the servers 210, the FCB 220 and the power control unit 230. Moreover, the IMM 240 is further used for managing power up and power down of all the servers 210. In addition, the IMM 240 assigns an MAC address for each of the BMCs 211-1 to 211-n through the management switch 250.

For example, an interface between the IMM 240 and the FCB 220 may be an Ethernet or RS-485. An interface between the IMM 240 and the power control unit 230 may be an Ethernet or a connecting line such as RS-485 or PMBus. The IMM 240 and the BMCs 211-1 to 211-n are connected through an Ethernet or an IPMI support connecting line.

The service switch 260 is coupled to the IMM 240 and service network ports of the servers 210. The servers 210 provide services to a service network through the service switch 260, and moreover, the service network is connected to a remote device. Accordingly, the IMM 240 can download the integrated management firmware from the remote device through the service switch 260.

When the server rack system 200 is started, the IMM 240 reads a current version serial number of currently installed firmware of each control chip such as the BMCs 211-1 to 211-n, the FCB 220, and the power control unit 230, and compares the current version serial number with the latest version serial number, so as to determine whether to update the currently installed firmware.

For example, integrated management firmware is installed in the IMM 240, and the integrated management firmware includes latest version firmware of each control chip such the FCB 220, the power control unit 230, and the BMCs 211-1 to 211-n, and records latest version serial numbers of the latest version firmware. That is to say, the firmware required for the control chips of the server rack system 200 is integrated in the integrated management firmware. Accordingly, when the server rack system 200 is started (for example, a power button is pressed down), the IMM 240 automatically obtains the current version serial number of the currently installed firmware from the control chips (including the FCB 220, the power control unit 230, and the BMCs 211-1 to 211-n) through the management switch 250, and compares the current version serial number with the latest version serial number recorded in the integrated management firmware. According to the comparison result, it is determined whether to update the currently installed firmware of the control chip.

In view of the above, through the foregoing embodiments, when a rack internal devices of the server rack system is randomly replaced, the server rack system can automatically detect whether the firmware of the rack internal device matches the newly installed hardware, and automatically updates the firmware, thereby solving the problem that the rack internal device is not compatible with the firmware.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
   a plurality of rack internal devices, wherein each rack internal device at least comprises a control chip, and the rack internal devices comprise a plurality of servers;
   an integrated management module (IMM), respectively coupled to the control chips, wherein the IMM stores integrated management firmware, and the integrated management firmware has latest version firmware of the control chips integrated therein, and records latest version serial numbers of the latest version firmware; and
   a management switch, coupled to the control chips and the IMM,
   wherein the control chips comprise a plurality of fan control boards (FCBs), and at least one power control unit;
   the IMM is coupled to the FCBs and rhe at least one power control unit through the management switch; when the server rack system is started, the IMM automatically obtains a current version serial number of a currently installed firmware of each of the FCBs and the at least one power control unit through the management switch, and compares the current version serial number of the currently installed firmware of each of the FCBs and the at least one power control unit with the latest version serial number recorded in the integrated management firmware to determine whether to update the currently installed firmware of each of the FCBs and the at least one power control unit.

2. The server rack system according to claim 1, wherein the IMM assigns a network address for each of the control chips through the management switch.

3. The server rack system according to claim 2, wherein a rack management terminal is coupled to the management switch, and the rack management terminal uploads the integrated management firmware through a file transfer protocol to the IMM.

4. The server rack system according to claim 1, wherein the integrated management firmware records a latest version serial number corresponding to each control chip and an overall version number.

5. The server rack system according to claim 4, wherein in a plurality of integrated management firmware with different overall version numbers, the comprised latest version firmware of the same control chip is the same or different.

6. The server rack system according to claim 1, wherein the IMM is coupled to the control chips through an Ethernet or a connecting line, so that the IMM manages the control chips through the Ethernet or the connecting line.

7. The server rack system according to claim 1, wherein the control chips comprise a plurality of baseboard management controllers (BMCs) in the servers.

8. The server rack system according to claim 7, wherein the integrated management firmware has latest version firmware of the BMCs integrated therein.

9. The server rack system according to claim 1 further comprising:
   a service switch, coupled to the IMM and service network ports of the servers, wherein the servers provide services to a service network through the service switch, and the service network is connected to a remote device,
   wherein the IMM downloads the integrated management firmware from the remote device through the service network.

* * * * *